INVENTOR.
WALLACE BOCK
CALVIN BOCK
BY
Hobbs & Easton
ATTORNEYS

INVENTOR.
WALLACE BOCK
CALVIN BOCK
BY
*Hobbs & Easton*
ATTORNEYS

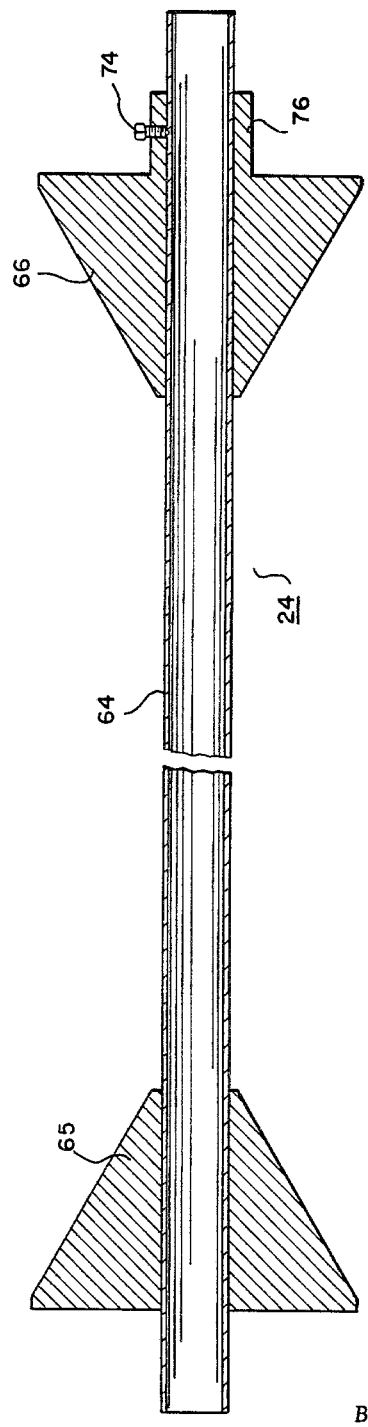

United States Patent Office 3,223,350
Patented Dec. 14, 1965

3,223,350
ROOFING DISPENSER
Wallace B. Bock and Calvin V. Bock, Elkhart County, Ind., assignors to Bock Industries of Elkhart, Indiana, Inc., Elkhart, Ind., a corporation of Indiana
Filed June 20, 1963, Ser. No. 289,328
8 Claims. (Cl. 242—86.52)

The present invention relates to a dispenser and more particularly to an apparatus for dispensing sheet roofing from a coil thereof.

In the trailer and mobile home industry, a frame and body are constructed and the sides and top of the body are covered with aluminum sheet or panel material. The roofing is usually delivered to the fabricating plant in relatively large rolls of a length approximately the same as the width of the trailer, and when the roofing is to be applied to the top of the trailer body, it is unrolled from the coil over the top of the trailer body lengthwise in one large piece and then severed from the rest of the roll at the upper edge of the body. The tail of the coil is then either dropped back to the coil or held in an elevated position by some improvised structure or frame. After the large sheet of roofing has been placed on top of the trailer body, it is preformed to the contour thereof and secured by any suitable securing means, such as nails, screws and/or molding, to form an attractive, water-tight roof for the trailer or mobile home.

Since the sheets are long and cover the entire width of the top of the trailer body, they are difficult to handle and apply to the trailer and often involve complicated, time consuming handling operations in merely cutting the sheet to the right size and locating the severed sheet in proper place on to the top of the trailer body. Further, in uncoiling the roofing material from the roll, an excessive amount may be uncoiled, thus rendering it difficult to place the roofing sheet in proper position and leaving a long tail on the coil, which is difficult to either recoil or hold in position until the next roofing operation, without damaging the roofing material.

Another difficulty in using the coiled roofing material has been the lifting of the tail of the coil from the roll to the top of the trailer body and pulling it lengthwise along the often relatively long trailer body tops, since the pieces are large and relatively heavy. It is therefore one of the principal objects of the present invention to provide a dispenser for sheet-like roofing material which lifts the tail of the coil to the upper edge of the trailer body, moves the sheet material along the top of the trailer body to the desired length, and then holds the tail and panel until the panel is severed, and which can be readily moved from one trailer to another as the roofing is required at various locations.

Another object of the present invention is to provide a power dispenser for sheet roofing material which can be controlled either from the floor or from the roof of the trailer to unreel or rereel the mateial to obtain the desired length of roofing panel, and which retains the tail of the reel in an elevated position adjacent the upper edge of the trailer body ready for the next operation, either at the same station or at any other selected station.

Still another object of the present invention is to provide a relatively simple, easily handled dispenser for sheet roofing material which effectively controls the advance and retraction of the sheet without denting, scratching or otherwise marring the roofing material or the surfaces thereof, and which virtually eliminates the manual handling of the sheet material from the coil for the full length of the trailer body top.

A further object is to provide a dispenser for coiled sheet roofing material in which the reel therefor is disposed adjacent the floor where it can be easily loaded with the coiled roofing material directly from a truck, dolly or the like without lifting the roll, and which has a low center of gravity and can be readily moved safely from one position to another without danger of upsetting.

Another object is to provide a readily controlled, relatively simple and easily fabricated roofing dispenser of the aforesaid type which is virtually service and maintenance free, and which can be operated without any special skill being required.

Additional objects and advantages of the present invention will become apparent from the following description and accompanying drawings, wherein:

FIGURE 4 is a horizontal cross sectional view of the reel on which the coiled roofing is mounted.

Figure 1:
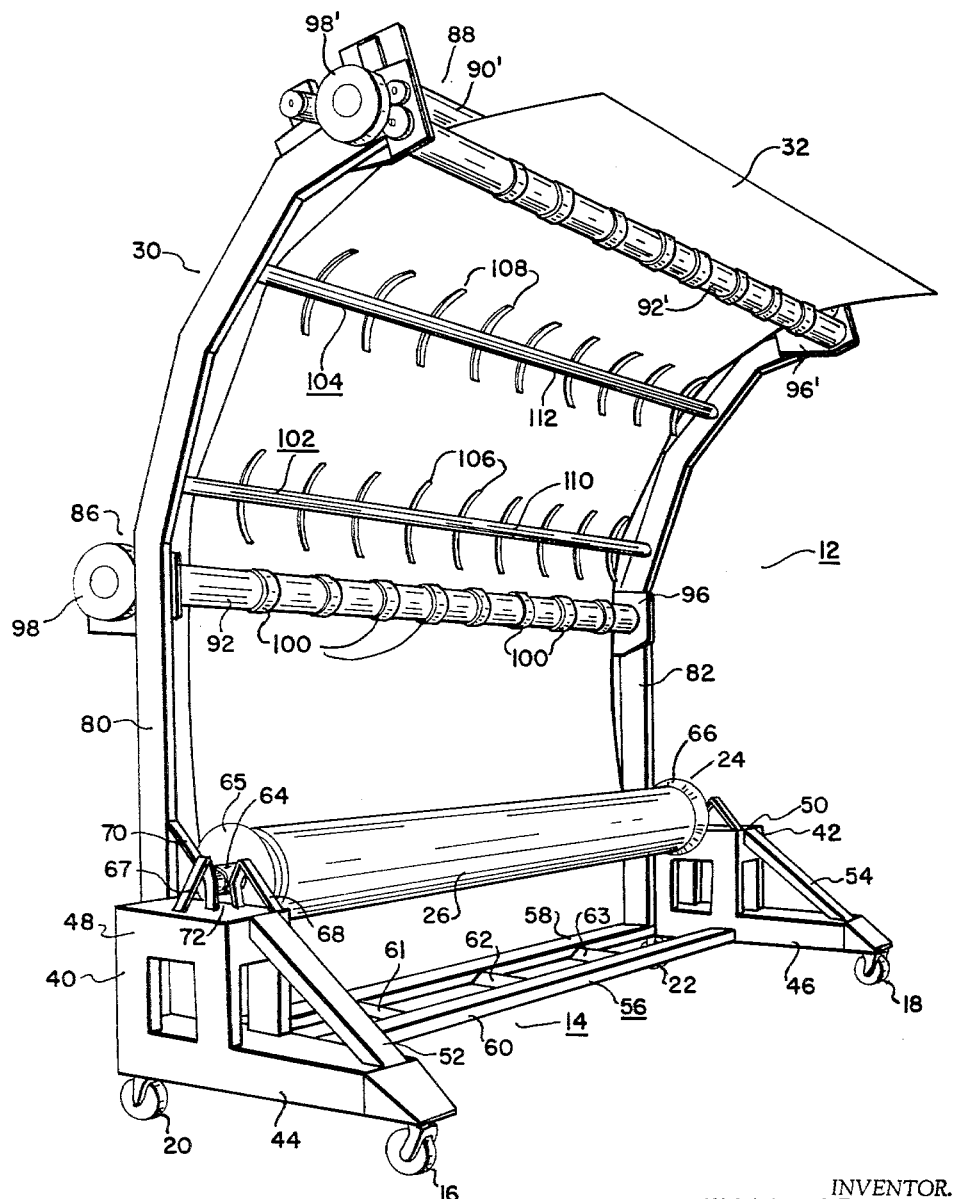
FIGURE 1 is a perspective view of the present dispenser for sheet roofing material showing a coil of the sheet material mounted therein and the tail thereof passing upwardly through the apparatus to the position where it is ready to be moved over the top of the trailer or mobile home body.

Referring more specifically to the drawings, and to FIGURE 1 in particular, numeral 12 designates generally the present roofing dispenser, 14 a base mounted on pivoted rollers 16, 18, 20 and 22, and having mounted thereon a reel 24 for receiving a roll of coiled sheet roofing material, designated by numeral 26. Mounted on base 14 is a frame 30 for supporting and delivering the tail 32 of the roofing material as it is uncoiled from roll 26. The coiled roofing material is normally formed of aluminum and fabricated from relatively narrow strips of approximately 24 to 30 inches in width, the seams between the strips extending transversely across the sheet, i.e., lengthwise with respect to roll 26, and the strips being joined to one another by a suitable water-proof joint. The present roofing dispenser is designed to handle the various types of roofing material supplied in coiled form.

The base consists of two end members 40 and 42 for supporting the ends of reel 24, the end members consisting of sills 44 and 46 and bodies 48 and 50, respectively. The end members 40 and 42 are reinforced by diagonal members 52 and 54, secured by welding or other suitable securing means to the steel sills and bodies. The end members 40 and 42 are connected by a frame 56, consisting of longitudinal members 58 and 60 connected at their ends by welding to the inner side of sills 44 and 46 and being separated by reinforcing spacer members 61, 62 and 63.

The reel, which is mounted on base 14, is supported on the upper end of bodies 48 and 50, and consists of a longitudinal tubular core 64 and two end cones 65 and 66 mounted on core 64 and extending into the hollow center of the coil. The ends of tubular core 64 are supported in a fixture consisting of a plurality of upstanding members 67, 68 and 70 at each end of the reel which, together, form a recess 72 for receiving the ends of the core. Cone 65 is firmly secured to core 64 and cone 66 can be adjusted lengthwise on the core to accommodate various widths of sheet material. Cone 66 is locked in its adjusted position by set screw 74 in collar 76.

Frame 30, which consists of two upstanding frame members 80 and 82 rigidly secured at their lower ends to bodies 48 and 50 of base 14, extends upwardly from the rear of the base and forwardly over the base, the two frame members 80 and 82 being spaced sufficiently far apart to permit the tail of the coil to be spaced therebetween. In the embodiment of the present invention shown in the drawings, a set of pinch rollers 86 is provided in the intermediate section of the frame, and a second pair of pinch rollers 88 is provided at the upper end of the frame. Since the two sets of pinch rollers 86 and 88 are the same in construction, design and operation, only one will be described in detail and the same numerals will be given to like parts in each set, with primes being used to designate the parts in set 88. The pinch roller set 86 consists of rollers 90 and 92 mounted in bearing member 96 and driven by a motor 98 through a gear reduction mechanism of any suitable design and construction readily available on the market. The two pinch rollers 90 and 92 are driven rather slowly and are provided with a series of spaced rubber bands 100, the bands on the two rollers corresponding to one another in location and contacting the tail 32 of the roofing on direct opposite sides thereof as the two pinch rollers 90 and 92 rotate. In order to assist the feeding of tail 32 from pinch roller set 86, two guide bars 102 and 104 are positioned in spaced relation between the two sets of pinch rollers, and are provided with a series of curved support members 106 and 108, respectively, on the two guide bars. The support members are joined to rods 110 and 112 of guide bars 102 and 104, respectively, and the rods are rigidly secured at their ends to frame members 80 and 82.

Figure 2:
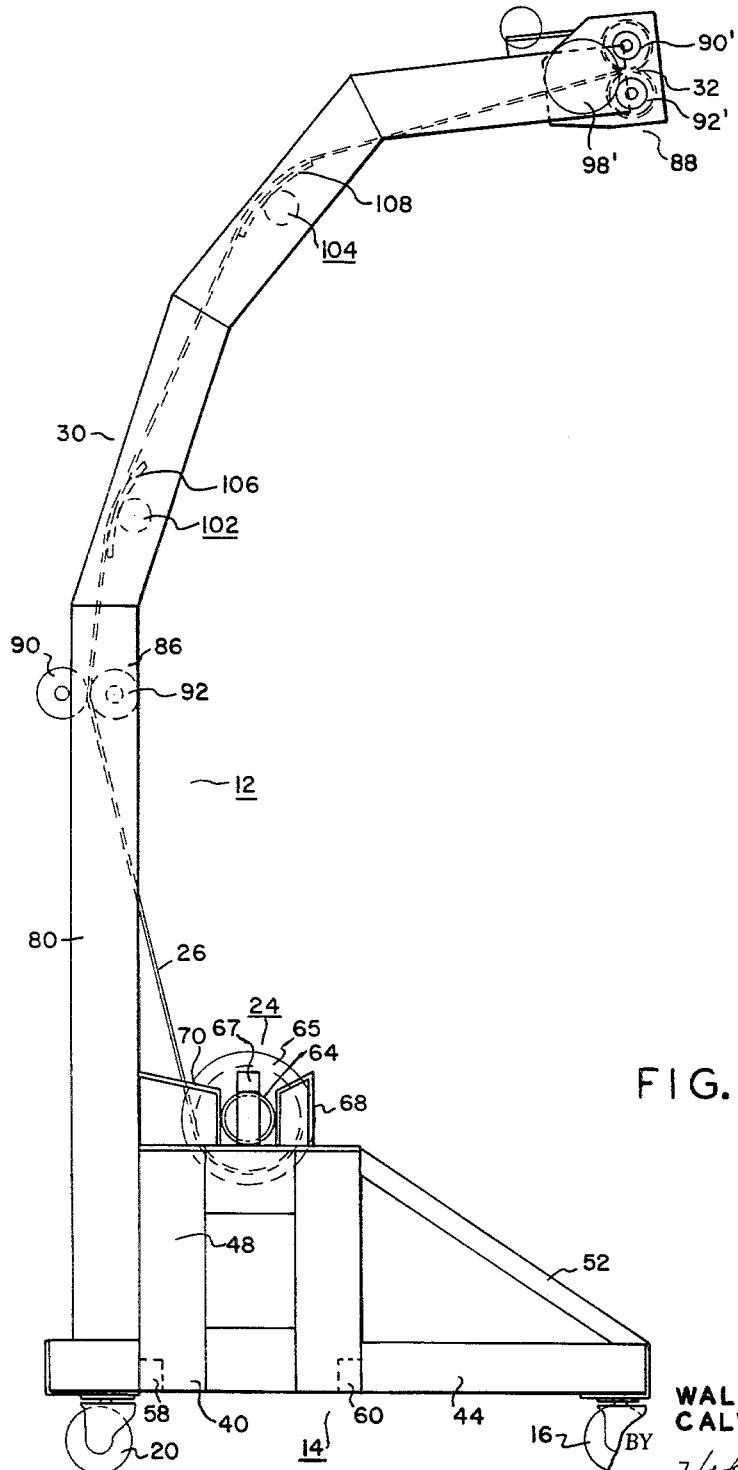
FIGURE 2 is an end elevational view of the roofing dispenser shown in FIGURE 1, showing a roll of roofing material therein and a tail extending from the roll to the upper edge thereof.
Figure 3:
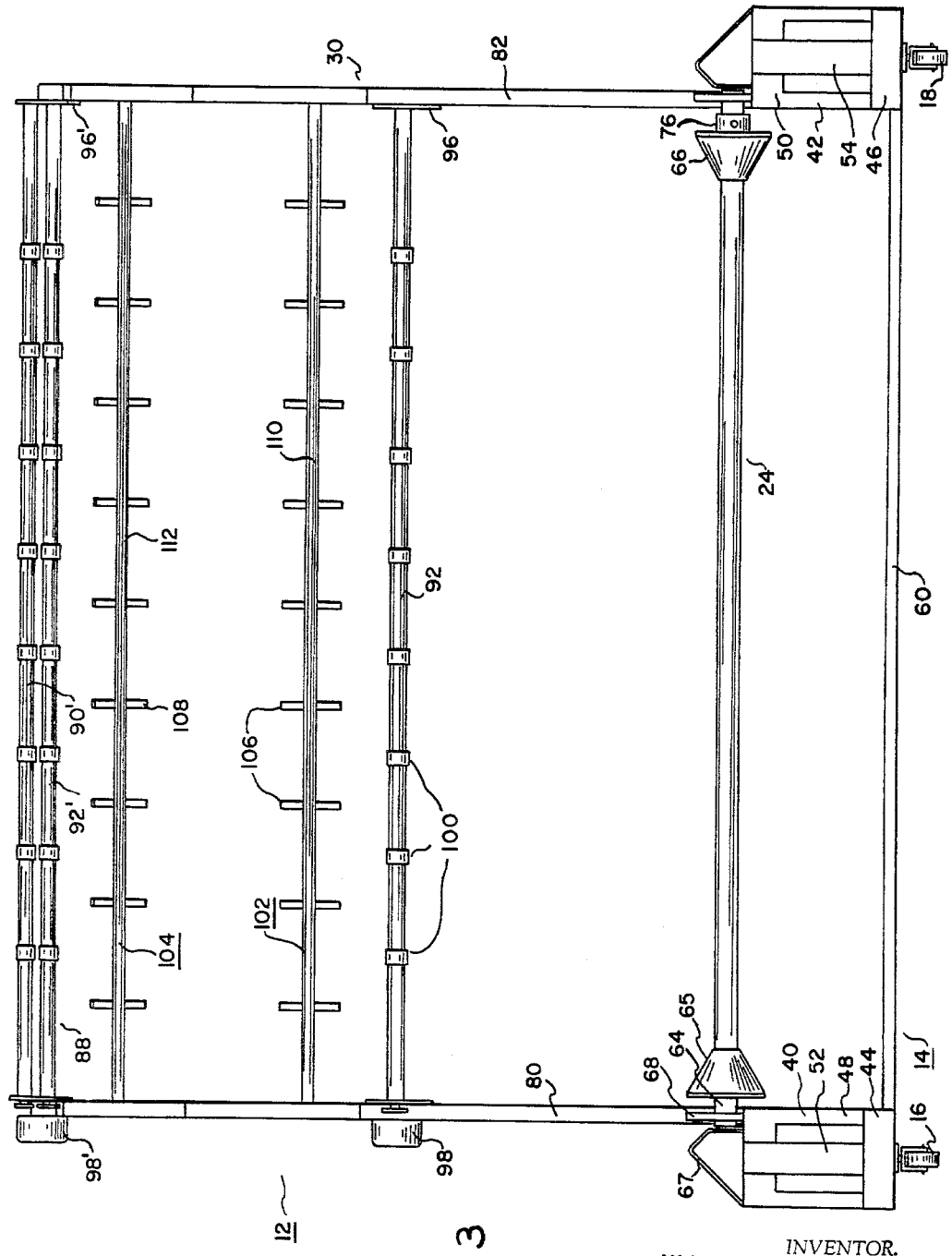
FIGURE 3 is a side elevational view of the roofing dispenser shown in FIGURES 1 and 2.

In the operation of the present dispenser for coiled roofing material, a roll of the roofing material is placed on reel 24 in the manner illustrated in FIGURES 1 and 2, and the tail is lifted manually and started through pinch rollers 90 and 92 of set 86. The motor 98 of the pinch roller drive is started and the tail is automatically fed upwardly over guide bars 102 and 104 to the second set of pinch rollers 88. The second set of pinch rollers need not be power driven since the first set will adequately force the tail through the two pinch rollers and along the top of the trailer as the sheet material is fed from the dispenser. When the roof dispenser is loaded in the manner illustrated in FIGURE 1, the roofing is ready to be uncoiled and fed onto the top of the trailer body by the operation of motor 98. The motor is controlled by an extension cord extending to the operator on the floor or on top of the trailer, and the motor is operated until the desired length of material is uncoiled from reel 24 and placed on top of the trailer body. If an excessive amount of roofing material has been inadvertently uncoiled, the motor 98 is reversed to retract the excessive roofing material and to recoil it on coil 26. After the desired length of roofing material has been uncoiled and placed on top of the trailer body, the sheet is severed adjacent the upper end of the dispenser at pinch rollers 88, thus leaving a tail extending beyond the rollers 90 and 92 preparatory for the next operation.

The dispenser can be operated satisfactorily without the rollers of set 88, using in their place merely a stationary guide means. While only one embodiment of the present invention has been described in detail herein, various changes and modifications may be made without departing from the scope of the invention.

We claim:

1. A dispenser for coiled roofing for trailers and mobile homes, comprising a base having two end support members, a reel on said base for the coiled roofing having a tubular core and two cones thereon for rotatably supporting a coil of roofing material and supported by said two end members, wheels for movably supporting said base, two upright frame members mounted rigidly on said base in spaced relation at opposite ends of said reel, said frame members being curved and extending from one side of said reel to a vertical plane on the opposite side thereof adjacent the normal height of a trailer, a pair of pinch rollers mounted on said frame members in the proximity of the midsection thereof for uncoiling the roofing material from the coil and delivering the uncoiled material to the upper end of the frame members, a motor for driving said pinch rollers, a second pair of pinch rollers mounted on said frame members near the upper end thereof for guiding the uncoiled roofing material onto the top of a trailer in a substantially horizontal direction, rubber-like bands on said rollers for gripping said roofing material, a motor for driving said second mentioned pinch rollers, and bars disposed between and parallel to said pairs of pinch rollers in spaced relation thereto for guiding the uncoiled sheet material to the upper end of said frame members.

2. A dispenser for coiled roofing for trailers and mobile homes, comprising a base having two end support members, a reel on said base for the coiled roofing having a tubular core and two cones thereon for rotatably supporting a coil of roofing material and supported by said two end members, wheels for movably supporting said base, two upright frame members mounted rigidly on said base in spaced relation at opposite ends of said reel, said frame members being curved and extending from one side of said reel to a vertical plane on the opposite side thereof adjacent the normal height of a trailer, a pair of pinch rollers mounted on said frame members in the proximity of the midsection thereof for uncoiling the roofing material from the coil and delivering the uncoiled material to the upper end of the frame members, a motor for driving said pinch rollers, a second pair of pinch rollers mounted on said frame members near the upper end thereof for guiding the uncoiled roofing material onto the top of a trailer in a substantially horizontal direction, and bars disposed between and parallel to said pairs of pinch rollers in spaced relation thereto for guiding the uncoiled sheet material to the upper end of said frame members.

3. A dispenser for coiled roofing for trailers and mobile homes, comprising a base having two end support members, a reel on said base for the coiled roofing having a tubular core and two cones thereon for rotatably supporting a coil of roofing material and supported by said two end members, wheels for movably supporting said base, two upright frame members mounted rigidly on said base in spaced relation at opposite ends of said reel, said frame members being curved and extending over said reel, a pair of pinch rollers mounted on said frame members in the proximity of the midsection thereof for uncoiling the roofing material from the coil and delivering the uncoiled material to the upper end of the frame members, a motor for driving said pinch rollers, and bars disposed above and parallel to said pair of pinch rollers in spaced relation thereto for guiding the uncoiled sheet material to the upper end of said frame members.

4. A dispenser for coiled roofing comprising a base, a reel on said base for the coiled roofing, wheels for movably supporting said base, two upright frame members mounted rigidly on said base in spaced relation at opposite ends of said reel, said frame members being curved and extending from one side of said reel to a vertical plane on the opposite side thereof at a height corresponding approximately to the position of the edge of the roof on which the roofing is to be applied, a pair of pinch rollers mounted on said frame members in the proximity of the midsection thereof for uncoiling the roofing material from the coil and delivering the uncoiled material to the upper end of the frame members, a motor for driving said pinch rollers, and bars disposed above and parallel to said pinch rollers for guiding the uncoiled sheet material to the upper end of said frame members.

5. A dispenser for coiled roofing comprising a base, a reel on said base for the coiled roofing, two upright curved frame members mounted rigidly on said base in spaced relation at opposite ends of said reel and extending from one side of said reel to a vertical plane on the opposite side thereof at a height corresponding approximately to the position of the edge of the roof on which the roofing is to be applied, a pair of pinch rollers mounted on said frame members for uncoiling the roofing material from the coil and delivering the uncoiled material to the upper end of the frame members, and means at the upper end of said frame members for supporting the uncoiled roofing material.

6. A dispenser for coiled roofing comprising a base, a reel on said base for the coiled roofing, an upstanding frame mounted rigidly on said base being curved and extending from one side of said reel to a vertical plane on the opposite side thereof adjacent the normal height of a trailer, a pair of pinch rollers mounted on said frame in the proximity of the midsection thereof for uncoiling the roofing material from the coil and delivering the uncoiled material to the upper end of the frame, a motor for driving said pinch rollers, and means near the upper end of the frame for guiding the uncoiled roofing material onto the top of a trailer in a substantially horizontal direction.

7. A dispenser for coiled roofing comprising a base, a reel on said base for the coiled roofing, an upstanding curved frame mounted rigidly on said base and extending from one side of said reel to a vertical plane on the opposite side thereof at a height corresponding approximately to the position of the edge of the roof on which the roofing is to be applied, a pair of pinch rollers mounted on said frame in the proximity of the midsection thereof for uncoiling the roofing material from the coil and delivering the uncoiled material to the upper end of the frame, a motor for driving said pinch rollers, and means near the upper end thereof for guiding the uncoiled roofing material onto the top of a trailer in a substantially horizontal direction.

8. A dispenser for coiled roofing comprising a base, a reel on said base for the coiled roofing, an upstanding frame mounted rigidly on said base being curved and extending over said reel to a height corresponding approximately to the position of the edge of the roof on which the roofing is to be applied, a pair of pinch rollers mounted on said frame for uncoiling the roofing material from the coil and delivering the uncoiled material to the upper end of the frame, a motor for driving said pinch rollers, and means near the upper end of the frame for guiding the uncoiled roofing material onto the top of a trailer.

References Cited by the Examiner
UNITED STATES PATENTS

| | | | |
|---|---|---|---|
| 987,593 | 3/1911 | O'Maley | 242—86.52 |
| 1,022,024 | 4/1912 | Girard | 242—86.52 |
| 1,953,092 | 4/1942 | Yoder | 242—78.7 |
| 2,558,788 | 7/1951 | Sillars | 242—67.2 |

MERVIN STEIN, *Primary Examiner.*